United States Patent [19]

Armas

[11] Patent Number: 4,552,193
[45] Date of Patent: Nov. 12, 1985

[54] PANELLED DOOR FRAME SHAPER TEMPLATE

[75] Inventor: Joe Armas, Fremont, Calif.

[73] Assignee: Armas & Harshbarger Manufacturing Co., Hayward, Calif.

[21] Appl. No.: 579,413

[22] Filed: Feb. 13, 1984

[51] Int. Cl.[4] ................................................ B27C 5/10
[52] U.S. Cl. ............................. 144/144.5; 144/144 R; 409/130; 33/562
[58] Field of Search ............... 33/174 G, 24 R, 24 C; 144/144 R, 144.5, 144.5 GT; 409/130

[56] References Cited

U.S. PATENT DOCUMENTS

| | | | |
|---|---|---|---|
| 4,062,123 | 12/1977 | Lundquist | 144/144.5 R |
| 4,095,632 | 6/1978 | Raulinaitis | 409/130 |
| 4,102,374 | 7/1978 | Klein | 144/144.5 R |
| 4,356,849 | 11/1982 | Fredrickson | 144/144 R |

Primary Examiner—W. D. Bray
Attorney, Agent, or Firm—Linval B. Castle

[57] ABSTRACT

An cabinetmaker's adjustable template for shaping uniform arches or crowns or the like on rails or stiles used in panelled cabinet doors of various sizes. Sub-templates preferably having similar but mirror-image shaper working edges are attached at one end of a base unit and at the opposite end of a second member that is slideably adjustable in a longitudinal slot in the surface of the base so that various length pieces of wood stock clamped to the surface of the base and between the corner ends of the base and slideable second member may be shaped with identical patterns.

4 Claims, 10 Drawing Figures

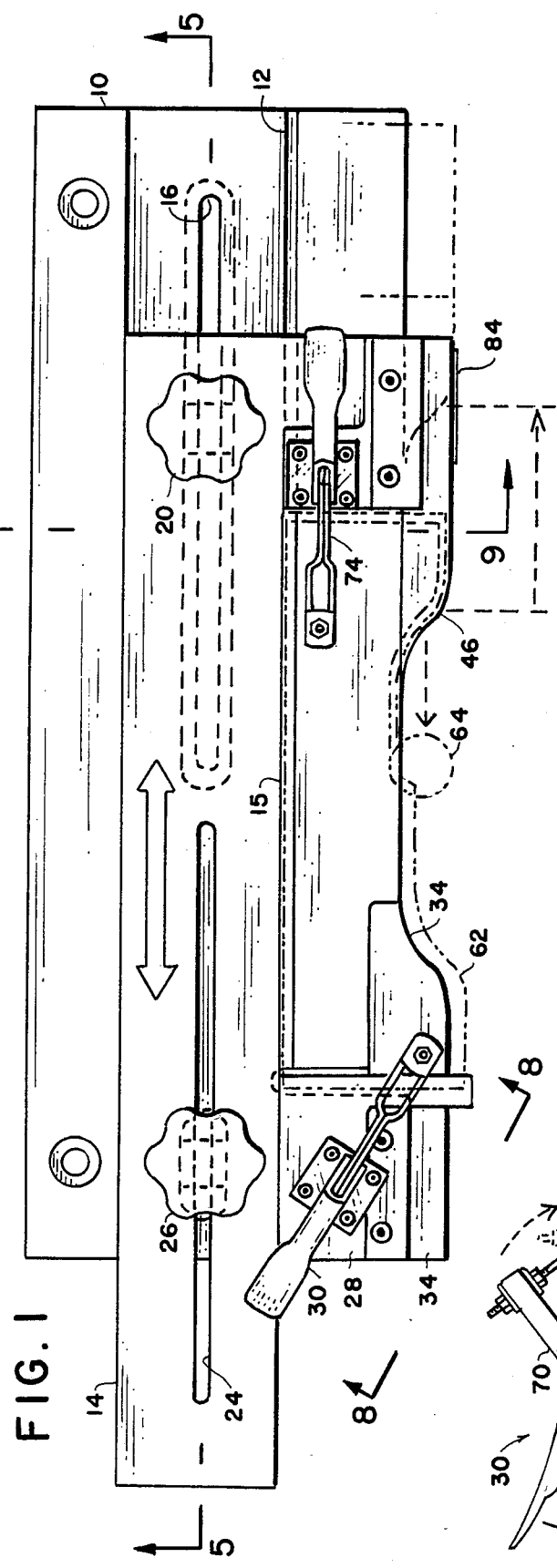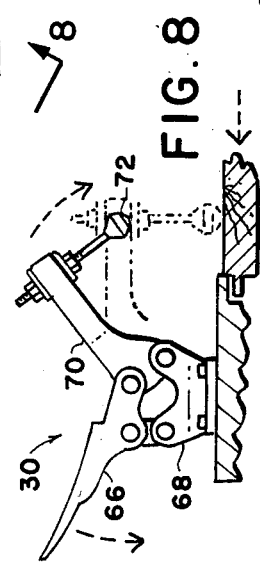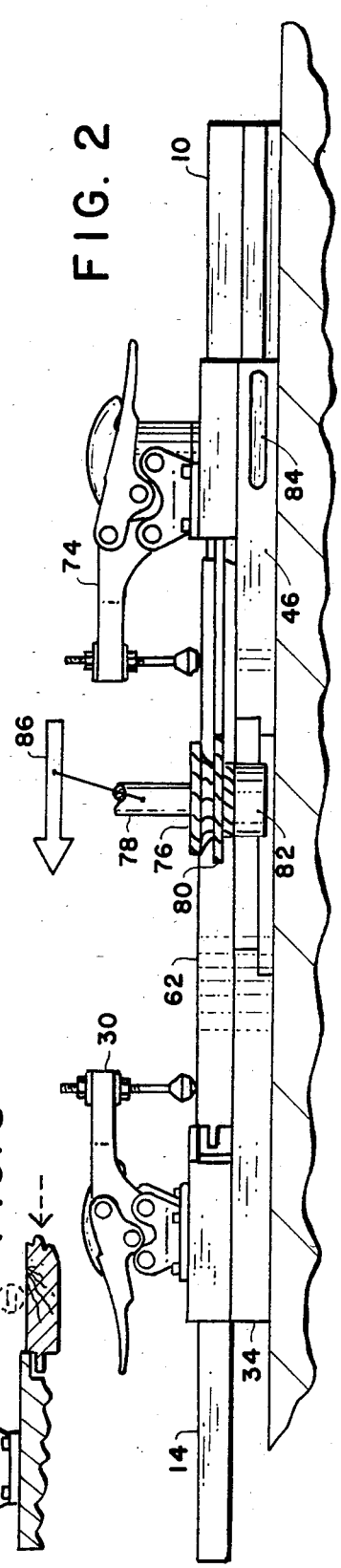

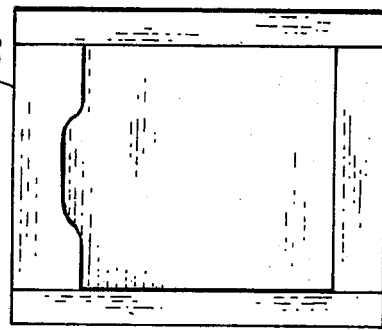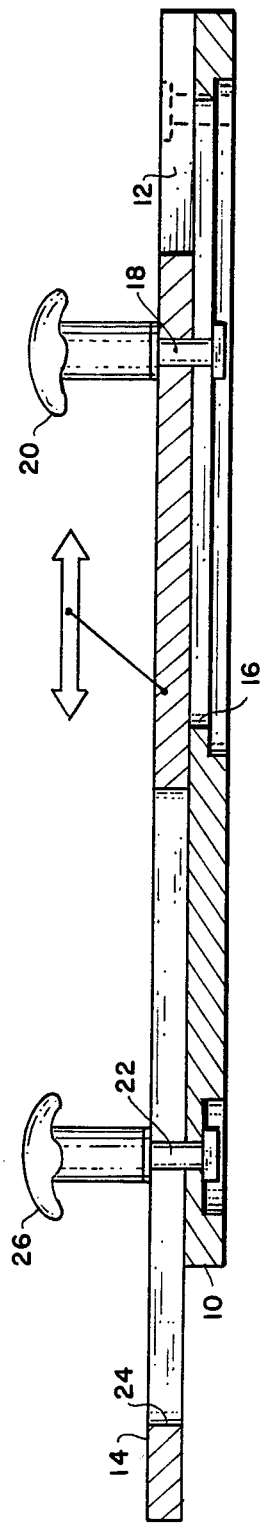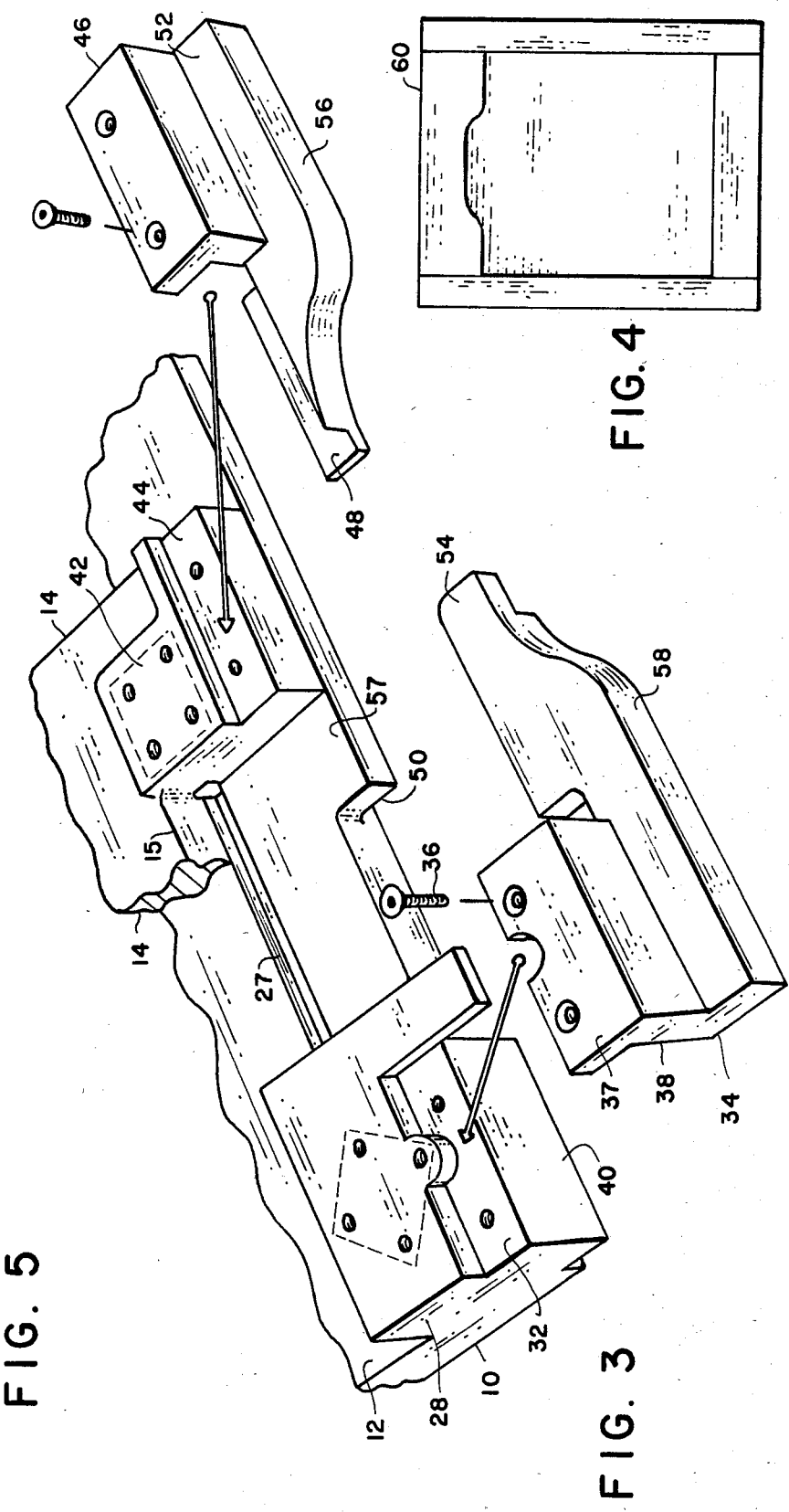

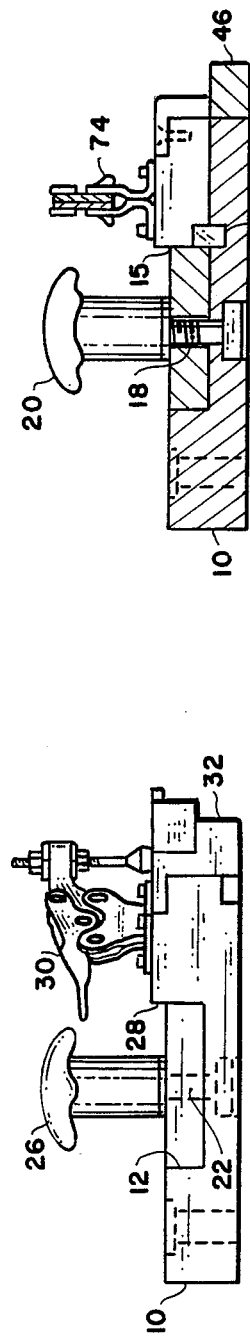
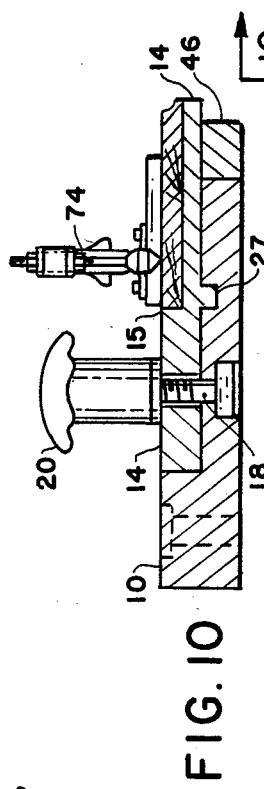
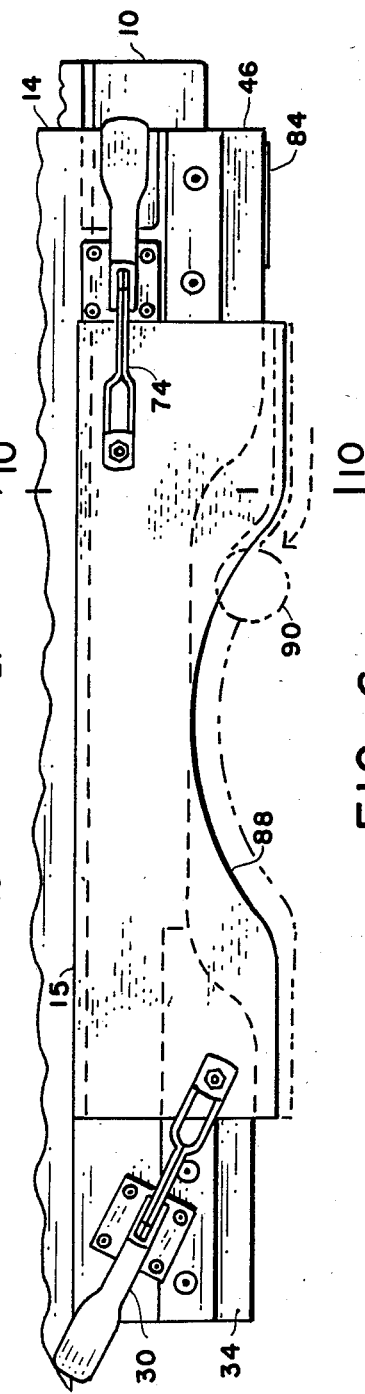
FIG. 7
FIG. 9
FIG. 10
FIG. 6

PANELLED DOOR FRAME SHAPER TEMPLATE

BACKGROUND OF THE INVENTION

This invention relates generally to cabinetmaker's shaper templates and in particular to an improved adjustable template for the shaping of uniform arched frame members for wood panelled doors.

Panelled doors are constructed of two vertical side members or stiles and two or more horizontal rails with both the stiles and rails having inside grooves or dadoes into which the door panels are fitted prior to the final assembly of the completed door.

Many types of panelled doors, particularly those used on fine hardwood cabinets, have various forms of ornamental arches and crowns formed in the inside edges of the vertical stiles and horizontal rails. To form uniform arches and crowns on the edges of lumber stock to be used to make several uniform cabinet doors, it is necessary for the cabinetmaker to use a shaper or suitable router having a desired cutter with a pilot that rolls against a template attached to the stock. The template must have a total length suitable for the particular rail or stile to be shaped and must be formed to correspond to the various arches, crowns or straight sections to be formed on the edge of the stock. If it is desired to shape large quantities of identical stiles or rails, only one template is required for rails and a second for stiles. But cabinetmakers of fine wooden cabinets are usually required to produce doors with identical crowns and arches, but for doors of various lengths and widths. Therefore, it is apparent that many different templates or various lengths and with various arch and crown patterns would normally be required.

The template to be described will replace all of the multitude of various size and shapes of shaper templates necessary in the well equipped cabinetmaker's shop. The template of the invention is adjustable in length and contains means for the attachment of suitable crown and arch templates so that it may be readily and rapidly adapted to any of the various lengths of rails or stiles that may be required in the manufacturing of various types and sizes of cabinet doors. The template includes means for clamping the wood stock and is sufficiently light in weight to permit the movement of template with the wood stock against a shaper cutter. In the alternate, the template with wood stock may be clamped to a suitable table so that a hand router or overhead shaper may be used to cut the desired moulding shape and panel groove in the edge of the stock.

DESCRIPTION OF THE DRAWINGS

In the drawings which illustrate the preferred embodiment of the invention:

FIG. 1 is a plan view of my shaper template;

FIG. 2 is a front elevation view illustrated with a cutter on an overhead shaper spindle;

FIG. 3 is a perspective view of a portion of the template and illustrates the attachment of arch templates thereto;

FIG. 4 is an elevational view of a typical panelled cabinet door illustrating a top rail shaped with arch templates;

FIG. 5 is a sectional elevation view taken along the lines 5—5 of FIG. 1

FIG. 6 is a plan view illustrating a portion of the template and the positioning of stock clamps thereon;

FIG. 7 is an end elevational view of the left end of the template illustrated in FIG. 1;

FIG. 8 is an elevational view of the left end stock clamp taken along the lines 8—8 of FIG. 7;

FIG. 9 is a sectional elevation view taken along the lines 9—9 of FIG. 1; and

FIG. 10 is a sectional elevational view of the template taken along the lines 10—10 of FIG. 6.

DETAILED DESCRIPTION

FIG. 1 illustrates a plan view of my template which includes an elongated base 10 which is preferably constructed of a lightweight metal such as aluminum approximately one inch thick and six to eight inches in width. A longtiudinal slot 12 approximately two inches wide and a half inch deep is formed in the top surface of the base and a longtiudinally adjustable member 14 slideably fits in the slot with an indexing edge 15 that is flush with the top suface of the base 10, as shown in FIG. 10. A second elongated slot 16 cut completely through the base 10 and centered in the slide member slot 12 accomodates a tightening bolt 18 that extends through the adjustable member 14 to a convenient manually rotatable knob 20. Thus, the adjustable member 14 may be firmly tightened in its slot 12 by tightening the knob 20 and its bolt 18 as shown in the sectional view of FIG. 9.

A second tightening bolt 22 extends through a hole through the base 10, the slot 12, and through an elongated slot 24 through the slideable member 14 and near the end of the member opposite the knob 20, as shown in FIG. 7. The second bolt 22 is threaded into a second knob 26, and as with the first knob 20, serves to secure the adjustable member 14 to the base. As shown in the perspective view of FIG. 3 and the sectional view of FIG. 9, the slideable member 14 is further secured in a longitudinal attitude by a key section in the lower surface of the member 14 that engages a track slot 27 in the top surface of the base 10.

As shown in FIG. 1, and more clearly in the perspective view of FIG. 3 and the elevation view of FIG. 7, the left front corner section 28 of the base 10 is raised approximately a quarter inch above the normal top suface and, as shown in FIG. 3, has tapped holes through the top surface to receive a lumber holdown clamp 30 to be described later in detail. The forward surface of the corner section 28 has a recessed area 32 for receiving an attachable sub-template, such as the arch template 34 shown detached in FIG. 3 and shown secured to the corner section 28 in FIG. 1, 2, 6 and 7. The sub-template 34 is secured to the corner section by suitable machine screws 36 which extend through an overlying arm 37 that mates with the recessed area 32 and into the top surface of the area 32, and a vertical shoulder 38 abuts the face 40 of the corner section 28.

As best illustrated in FIG. 3, the adjustable member 14 that is slideable within the longitudinal slot 12 of the base 10 is formed with a similar raised corner section 42 for supporting a lumber stock holdown clamp, and has a recessed forward surface 44 to which is attached a sub-template such as the arch template 46. The template 46 has an underlying lip 48 which slideably engages a corresponding groove 50 that extends across most of the front lower surface of the base 10 and to the right edge of the sub-template 34 so that, if desired, the moveable arch template 46 could be moved into contact with the stationary template on the base 10. Similarly, the stationary template 34 is formed to mate with the front edge portion of the base and into that portion up to the groove 50 as illustrated in the plan view of FIG. 1. Therefore, the top working surface 52 of the moveable template 46, the top surface 54 of the stationary template 34, and the top surface 57 of the base 10 are coplanar and together form a smooth working surface upon which lumber stock may be clamped for shaping.

The design of the working edges of the sub-templates is, of course, a matter of choice because the design determines the shaped pattern of the cabinet rails and/or stiles. In the embodiment being described, a simple arch pattern is illustrated so that the working edge 56 of the moveable template 46 and the edge 58 of the stationary template 34 are formed as mirror images and correspond to the desired pattern such as that of the top rail 60 in the typical cabinet door illustrated in FIG. 4. Other template designs obviously may be employed with the adjustable shaper template.

In operation, a wood blank of appropriate length for the desired cabinet rail or stile is placed on the front top surface of the base 10 against the indexing edge 15 of the adjustable member 14 in the slot 12 and between the stationary corner section 28 and the moveable member corner section. The bolt knobs 20 and 26 are loosened and the adjustable member 14 is moved toward the left to confine the wood blank between the two corner sections. A typical confined wood blank 62 roughly bandsawed to the approximate desired profile is illustrated by broken lines in the plan view of FIG. 1. As shown by dashed lines a typical shaper or router cutter 64, moving toward the left as shown by the arrow, forms the desired design in the edge of the wood stock as well as the required center groove in the edge of the stock for the cabinet panel.

FIG. 8 is an elevational view illustrating the preferred holdown clamp 30 previously mentioned. The clamp 30 is an "over-the-center" type having a handle 66 pivoted to a base portion 68 and to an arm 70 which pivots downward as shown by the dashed arrow when the handle 66 is depressed as shown by its arrow. At the distal end of the arm is an adjustable screw with a rubber tip 72 which contacts the surface of the stock when the screw is properly adjusted according to the thickness of the wood stock.

As shown in FIG. 1, the holdown clamp 30 on the stationary corner section 28 is angled approximately 30° with respect to the longitudinal axis of the base 10. The angling of the clamp is important because, when tightened, the clamp 30 not only draws the end of the wood stock against the corner section 28 but also draws the edge of the stock snugly back against the indexing edge 15 of the adjustable member 12 in the slot 12. Then the second holdown clamp 74 on the corner section of the adjustable member is tightened and the wood stock in firmly clamped.

The elevational view of FIG. 2 illustrates a piece of wood stock 62 firmly clamped in position by the two clamps 30 and 74. Also illustrated but not forming a part of the invention is a typical quarter round shaper cutter 76 mounted on the shaper spindle 78 with a groove cutter 80 and a ball bearing pilot 82. In operation, the very high speed spindle is first positioned so that the rotating pilot 82 is pressed against a rubber stall pad 84 mounted to the working edge of the moveable sub-template; this stops the rotation of the pilot. Then the pilot 82 is moved toward the left as shown by the arrow 86 so that the shaper cutters shape the edge of the wood stock 62. If desired, the entire adjustable shaper template with wood stock attached may be moved against the cutter spindle of a stationary shaper, or a moveable shaper spindle may be used.

FIG. 6 illustrated a roughly cut piece of wood stock 88 clamped in position in the template and the operation of shaper cutters 90. The arch templates 34 and 46 are shown with the working edges as dashed lines beneath the stock 88 and, to conform the edge of the stock to the template arches, it will be necessary to make several shaper passes through the wood. However, if only a panel groove is being cut by the shaper cutter, and an ornamental beading is not desired, only a panel groove cutter with a pilot bearing against the curved edge of the stock may be used as illustrated.

The template has been described with sub-templates as being only corner arches such as shown in the shaped top rail of the cabinet door of FIG. 4. If desired, longer sub-templates may be attached to my template for shaping crowns or other patterns in the center portions of the rails or upon the horizontal rails or on the vertical side stiles or such doors.

I claim:

1. An adjustable template for the shaping of panelled cabinet door rails and stiles, said template comprising:
    an elongated base having a substantially plane top surface with a longitudinal slot therein, a substantial length of a first edge on a longitudinal first side of said elongated base being parallel with the axis of said slot;
    a longitudinally adjustable elongated slideable member within the slot in the surface of said base, said slideable member having an indexing edge extending to the top surface of said base;
    means for locking said slideable member at any desired location within said slot;
    a first removeable sub-template secured to a front corner on said first side of said base, said first sub-template haveing a top surface coplanar with the top surface of said base and a working edge corresponding to the desired form of a shaped cabinet door component, said first sub-template extending to that portion of said first edge of said base that is parallel with said longitudinal straight slot;
    a second removeable sub-template secured to a forwardly extending corner on said elongated slideable member that overlies the surface of said base, said second sub-template having a top surface coplanar with the surfce of said base and said first sub-template and having a working edge terminating on that portion of the front edge of said base that is parallel with said longitudinal straight slot; and
    first and second stock clamping means respectively positioned on said front corner of said base and on said forwardly extending corner of said slideable member for securing a piece of stock to be shaped against said slideable member index edge and between the corner on said base and said slideable member.

2. The adjustable template claimed in claim 1 wherein said means for locking said slideable member comprises a first tightening bolt extending through said slideable member and a longitudinal slotted opening in the longitudinal slot in the surface of said base, and a second tightening bolt extending through said base and a longitudinal slotted opening in said slideable member.

3. The adjustable template claimed in claim 2 wherein said first clamping means operated to draw the piece of stock to be shaped toward the corner of said base and toward said indexing edge.

4. The adjustable template claimed in claim 3 further including stalling means on the working edge of one of said sub-templates for halting the rotation of a rolling pilot on a shaper spindle.

* * * * *